United States Patent [19]
Fuqua, III

[11] Patent Number: 6,061,216
[45] Date of Patent: May 9, 2000

[54] LIGHTNING BREAKER

[76] Inventor: Charles H. Fuqua, III, 213 Keuka, Joliet, Ill. 60436

[21] Appl. No.: 08/640,621

[22] Filed: Aug. 8, 1996

[51] Int. Cl.[7] ...................................................... H02H 3/00
[52] U.S. Cl. .............................. 361/1; 361/115; 361/117
[58] Field of Search ................................ 361/1, 117, 115

[56] References Cited

U.S. PATENT DOCUMENTS

| | | | |
|---|---|---|---|
| 5,083,042 | 1/1992 | Merchant | 361/1 |
| 5,453,899 | 9/1995 | Page | 361/1 |
| 5,521,603 | 5/1996 | Young | 342/198 |

Primary Examiner—Stephen W. Jackson

[57] ABSTRACT

This apparatus is a device that connects to electrical or electronic equipment that is to be protected from lightning. The device detects amplitude modulation radio frequency signals (electrostatic energy) emitted from an electrial storm, lightning, by a detector (2) which sends energy to signal a trigger relay (4) to activate an interval timer (6) and one of four alternate relay systems to disconnect the device and the equipment sought to be protected from a power source, antenna or other equipment. The device then provides power from a battery (16), thereby isolating the equipment sought to be protected from lightning damage for a predetermined interval of time. When the threat of lightnng damage has past, the device automatically reconnects and restores the device and the electrical or electronic equipment to the original power source.

4 Claims, 4 Drawing Sheets

Beginning Stage

Beginning Stage

First Optional Relay System 25

Second Optional Relay System 41

Third Optional Relay System 67

LIGHTNING BREAKER

BACKGROUND OF THE INVENTION

1. Field of the Invention

This invention pertains to the protection of electrical and electronic equipment during periods of atmospherical electrostatic discharge, lightning.

2. Description of the Prior Art

Prudent practices suggest that electrical and electronic devices should be protected from high levels of energy which could cause irreparable damage to them. Atmospherical electrostatic discharges, or lightning, has always presented a problem for electrical and electronic devices. Some damage caused by lightning is obvious, while other types of damage can take a long time to be detected.

The modem day method of protecting electrical or electronic devices from damaging levels of energy is to use a surge protector, which could be a spark gap, a chem gap, or a metal oxide varistor. Surge protectors are made with two plates isolated from each other by either an air or chemical vapor. The space between the two plates determines how much electrical energy is needed to form an arc from one plate to the other, as well as who made the surge protector unit in what it is encapsulated, and what chemical is used to separate the two plates. Extending outside the encapsulation are two leads. One lead is attached to one plate and the second lead is attached to the second plate. Normally, one wire is connected to ground, and the other wire is connected to an electrical supply line. The surge protector will remain inactive until the electrical energy in the supply line reaches the level needed to form an arc in the surge protector. Once the arc is formed, all the electrical energy the supply line can provide will be diverted to ground through the surge protector. The transfer of energy to ground can create a demand for energy far exceeding the limits of the supply line which can cause a fire. A circuit breaker is put into the supply line prior to the surge protector to prevent this from happening. When the energy level of the supply line reaches a predetermined level, the circuit will kick out and stop energy from going beyond that point. In order to restore power to the other components connected to the supply line, the circuit breaker has to be manually reset.

Surge protectors have been known to cause fires. The more electrical hits a surge protector takes the wider the gap between the two plates becomes. The wider the gap is, the more energy it takes to form an arc between the two plates which means that the other components connected to the power supply line will be subjected to higher and higher levels of energy spikes until the components either break down or catch on fire.

Another problem is that surge protectors are incorrectly being used as a form of lightning protection, which they were not designed for. A power surge is different from a lightning strike in several ways. First, although a power surge is capable of reaching extremely high levels of energy, these levels are not nearly as high as the levels of energy that a single bolt of lightning can produce. Furthermore, the speed at which the energy from a bolt of lightning travels is much faster than the speed of energy during a power surge. Therefore, by the time the surge protector reacts to the lightning, strike damage has already been done to the device that was supposed to be protected.

Yet another problem is the belief that electrical and electronic devices should be grounded during an electrical storm. This belief is incorrect. Then a cloud fully charged with kinetic energy drifts overhead, it seeks a good ground fault to discharge its energy into. Grounded electrical equipment offers the quickest and shortest route for lightning to discharge into. Hence, what has been created is another path for lightning which is highly undesirable.

SUMMARY

The LB, Lightning Buster, is an invention capable of detecting and reacting to an approaching field of discharging electrostatic energy, lightning, automatically before it is close enough to damage the electrical or electronic device that the LB was intended to protect. The LB reacts to the approaching field of electrostatic energy by disconnecting and thereby isolating devices from all power sources, antennae or other devices until the field of discharging electrostatic energy has left the area and the threat of damage has past. This is equivalent to as though a person had been present to unplug the devices. The LB mill then automatically reconnect these devices back to their original power source after the threat of damage has past. The LB offers advantages over the prior art in that it does not wait for lightning to strike in order to protect a device; it protects the device before the danger nears. Whereas, the prior art surge protectors expose valuable and expensive electrical and electronic equipment to lightning and other high levels of energy before attempting to protect this equipment by diverting the energy to ground. Furthermore, manufacturers of electrical and electronic equipment recommend that their products be unplugged during electrical storms, thereby isolating them from the power source and ground. However, the LB not only isolates equipment, it detects, reacts, isolates and resets automatically so that the user need not be present to unplug, plug in equipment, or press any reset buttons.

The LB is powered by an outside power source until it detects an electrostatic field of energy. It detects radio frequency signals emitted by a storm at all times: before its presence. as it is approaching, during the storm, and as the storm passes. When the LB detects a storm approaching, the LB will switch to a separate, isolated battery power, thereby protecting the device connected to it from lightning. When the LB detects that the storm has past, it reconnects to the outside power source. All functions of the LB are fully automatic independently.

DESCRIPTION OF THE PREFERRED EMBODIMENTS

Figure 1:
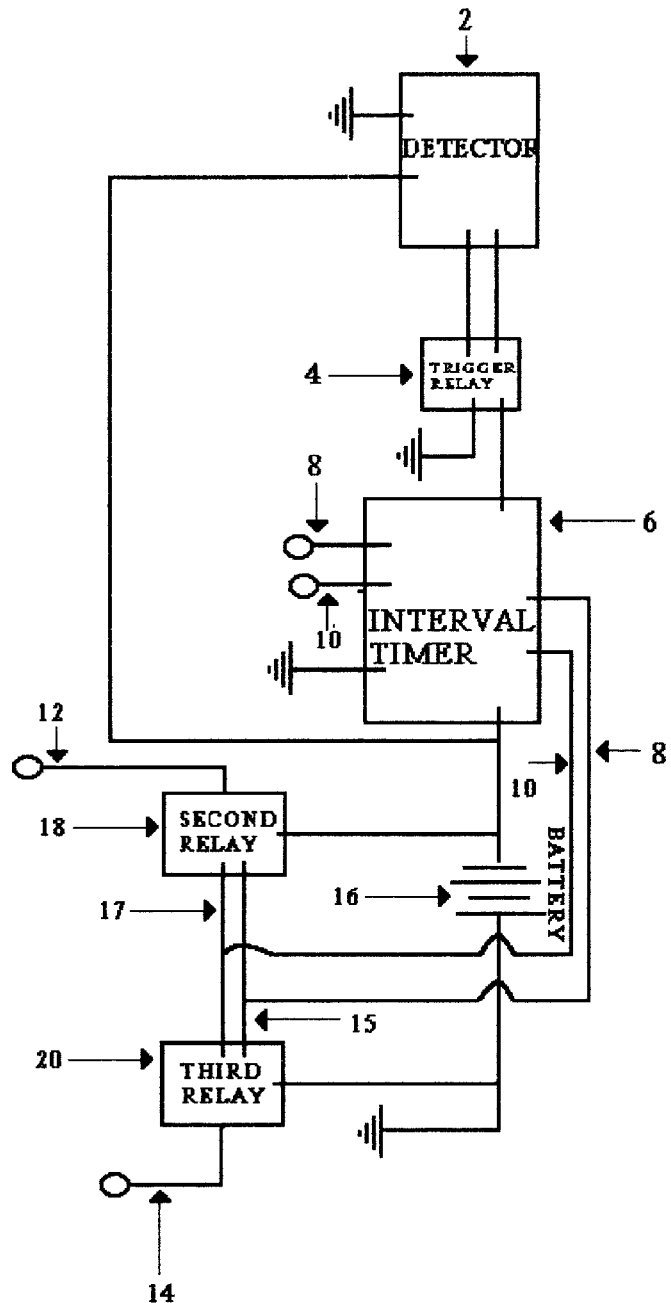
FIG. 1 shows the basic components of the LB.

The LB is shown with its basic components and in its beginning stages of operation in FIG. 1. It has a detector (2) capable of detecting amplitude modulation radio frequency signals emitted from an electrical storm, lightning. A first coil (3) of a trigger relay (4) is connected to the output (1) of the detector (2). A first contact (7), normally open, of the trigger relay (4) is connected to an interval timer (6). When the detector (2) detects lightning, it emits energy through the output (1) to the trigger relay (4) energizing the first coil (3) which activates the interval timer (6). The first sweeper arm (5) of the trigger relay (4) is connected either to ground or to the power source of the LB, depending on what is needed to activate the interval timer (6). When the detector (2), the trigger relay (4), and the interval timer (6) are activated, a battery (16) provides power to the LB and to the electrical or electronic equipment to be protected at a first connection (8) and a second connection (10) for a measured amount of time. When the LB is not activated, the battery (16) is kept fully charged and power to the LB is supplie and maintained through a second relay (18) and a third relay (20). A second coil (17) of the second relay (18) and a third coil (19) of the third relay (20) are connected at the first connection (8) and the second connection (10) of the interval timer (6). A second contact (13), normally closed, of the second relay (18), and a third contact (15), normally closed, of the third relay (20) are connected to the battery (16), positive to positive and negative to negative terminals. A power source, antenna or other equipment provide power at these two connections to the LB when the LB is not activated, and they can be used to charge the battery (16). When the LB is activated, the second coil (17) of the second relay (18) and the third coil (19) of the third relay (20) become energized causing the second contact (13) and the third contact (15) to open. This action disonnects the outside power source at a third connection ( 12) and a fourth connection ( 14), and the battery (16) then provides power to the LB for a measured amount of time controlled by the interval timer (6).

Figure 2:
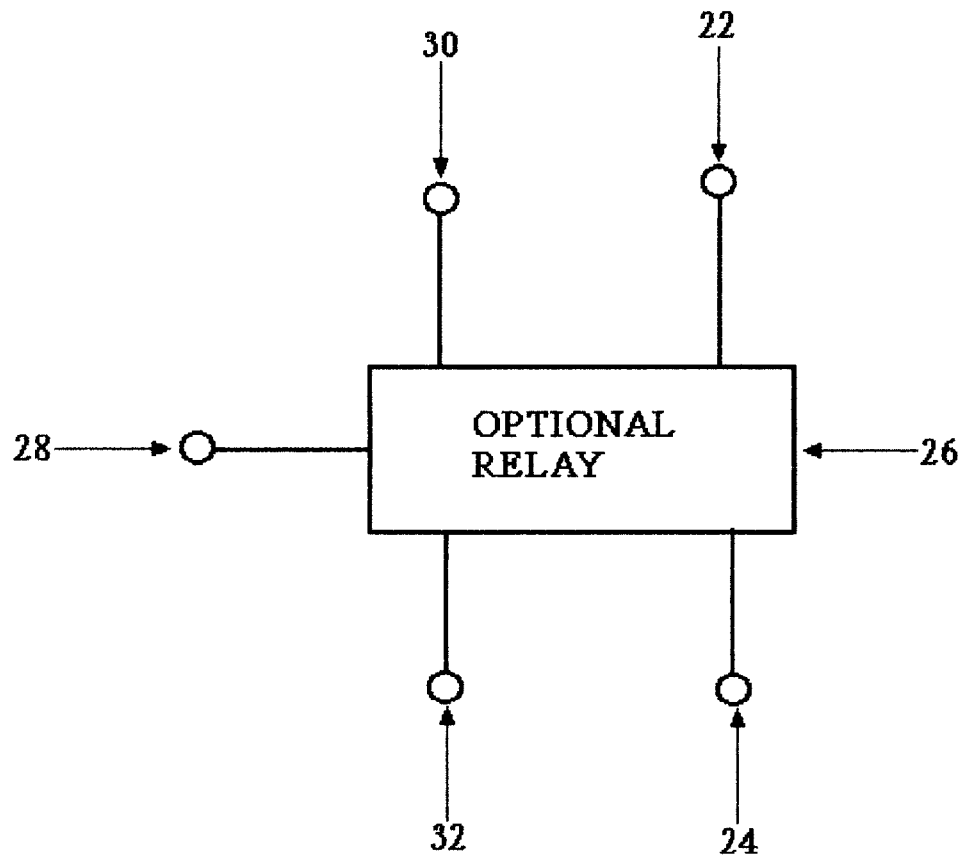
FIG. 2 shows the first optional relay system (25) as an alternate embodiment to be connected to the LB shown in FIG. 1.

An alternate embodiment for the LB includes a first optional relay system (25) which uses a fourth relay (26) as shown in FIG. 2. The LB can use as many first optional relay systems (25) as are needed provided the fourth coil (27) of each fourth relay (26) is connected in parallel with the initial fourth relay (26) at a fifth connection (22) and a sixth connection (24). Although the fourth coils (27) can be connected in series, series connections will limit the number of first optional relay systems (25) that can be used, and therefore, connections in parallel are preferred.

The first optional relay system (25) shown in FIG. 2 is connected to the LB as shown in FIG. 1 at the first connection (8) and the second connection (10) of the interval timer (6). The equipment sought to be protected from lightning is connected to the fourth relay (26) at a seventh connection (32). When the interval timer (6) is activated, the fourth coil (27) of the fourth relay (26) becomes energized which causes the second sweeper arm (28) to open and break contact at the seventh connection (32), which is normally closed, and make contact at an eighth connection (30). With this action, the equipment sought to be protected from lightning is disconnected from the power source, antenna, or other equipment and has power supplied to it by the battery (16). The eighth connection (30) can be left open or connected to ground depending on the needs of any additional apparatus connected at that site.

Figure 3:
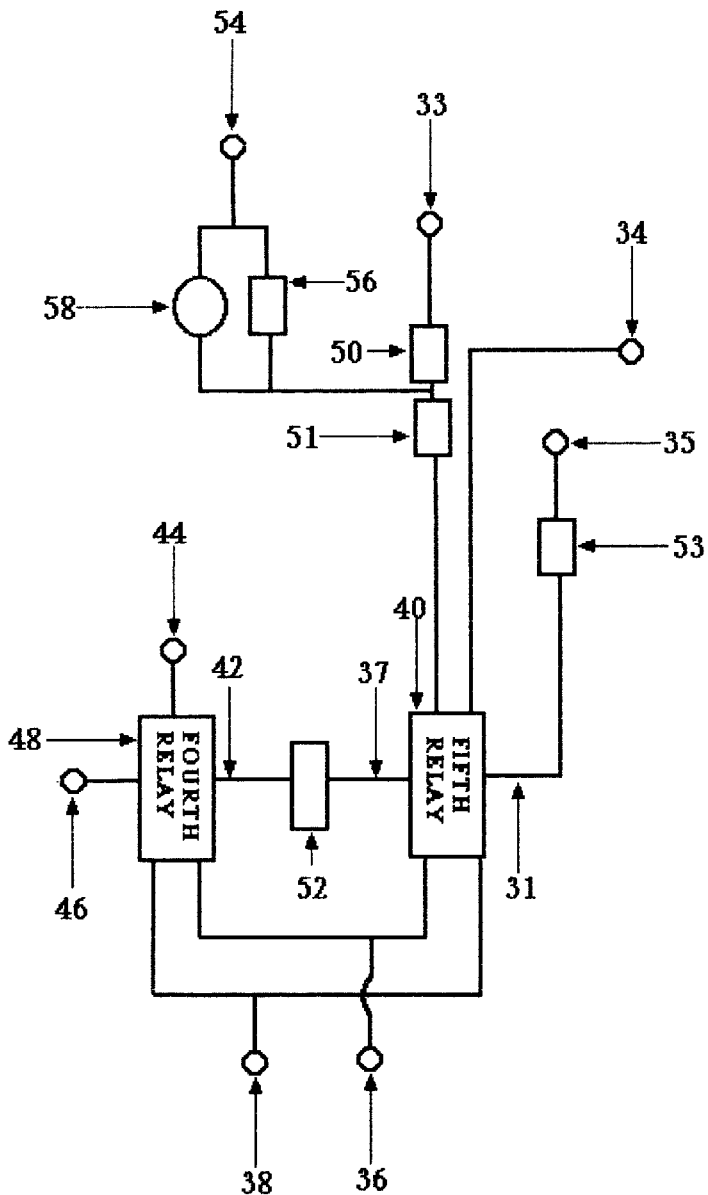
FIG. 3 shows the preferred embodiment of the second optional relay system (41) which connects to the LB shown in FIG. 1.

The preferred embodiment for the LB includes a second optional relay system (41) as illustrated in FIG. 3, utilizing a fifth relay (40) and a sixth relay (48). The LB can have as many second optional relay systems (41) as are necessary as long as the fifth relay (40) and the fixth relay (48) are connected in parallel with the initial second optional relay system (41). The second optional relay systems (41) could be connected in series, but series connections would limit the number of second optional relay systems (41) that could be connected to the LB; hence, parallel connections are preferred. The fifth relay (40) and the sixth relay (48) are connected to each other in parallel at a nineth connection (36) and a tenth connection (38). The second optional relay system (41), at the nineth connection (36) and the tenth connection (38 ), is then connected to the LB as shown in FIG. 1 at the first connection (8) and the second connection (10) of the interval timer (6). The fifth relay (40) has a third sweeper arm (31), an eleventh connection (37) that is normally closed, a twelfth connection 34 that is normally open, and a thirteenth connection (35) at which power from the power source, antenna, or other equipment enters. The sixth relay (48) has a fourth sweeper arm (42), a fourteenth connection (46) that is normally closed, and a fifteenth connection (44) that is normally open. When the LB is activated, the fifth coil (39) of the fifth relay (40) and the sixth coil (47) of the sixth relay (48) become energized causing the third sweeper arm (31) and fourth sweeper arm (42) to break and open their normally closed contacts at the eleventh connection (37) and fourteenth connection (46) respectively and make contact with the normally open contacts at the twelfth connection (34) and the fifteenth connection (44). This is the action that isolates the equipment to be protected from lightning by disconnecting it from the power source, antenna, or other equipment and supplying power to it from the battery (16).

Now there are three spark gaps needed and connected to the second optional relay system (41) as shown in FIG. 3. They are identified and illustrateded as a first spark gap (50), a second spark gap (56), and a third spark gap (58). Spark gaps are used to divert any energy above a safe level to ground. However, not wanting to have a ground because it draws lightning, to divert excessive energy, the first spark gap (50), the second spark gap (56), and the third spark gap (58) are added establishing a ground without drawing lightning at the twelfth connection (34). A ground for the spark gaps is provided at a sixteenth connection (54). Since spark gaps tend to require more energy in response to excessive energy levels, a first fuse (51), a second fuse (52), and a third fuse (53) are placed as shown in FIG. 3 to protect the equipment we want protected. The fuses are an indicator that the LB has taken a lightning hit and is no longer reliable.

Figure 4:
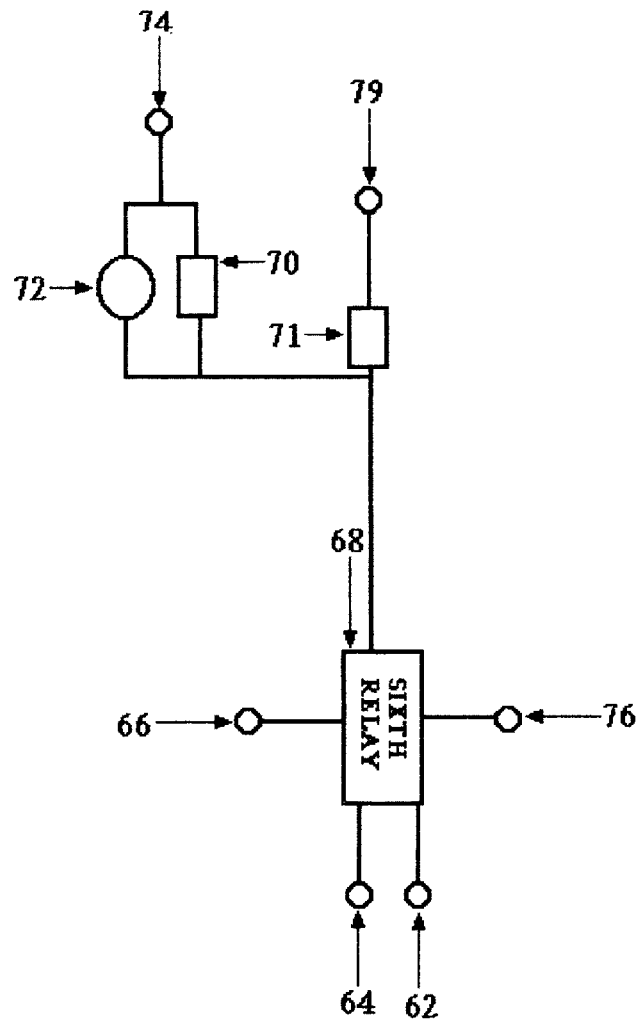
FIG. 4 shows the third optional relay system (67) as an alternate embodiment which connects to the LB shown in FIG. 1.

A second alternate embodiment for the LB uses a third optional relay system (67) consisting of a seventh relay (68) as shown in FIG. 4. The seventh relay (68) is connected at a seventeenth connection (62) and an eighteenth connection (64) to the LB as shown in FIG. 1 at the first connection (8) and the second connection (10) of the interval timer (6). The LB can have as many third optional relay systems (67) as are needed as long as the seventeenth connection (62) and the eighteenth connection (64) are connected in parallel to the initial seventh relay (68). These connections can also be in series, but series connections limit the number of the seventh relays (68) that can be used. Again, parallel connections are preferred.

The fifth sweeper arm (66) of the seventh relay (68) connects to the power source. antenna or other equipment. The equipment to be protected from lightning is connected to the seventh relay (68) at a nineteenth connection (76) that is normally closed. When the LB is activated, the seventh coil (69) of the seventh relay (68) is energized causing the fifth sweeper arm (66) to break and open its nineteenth connection (76) and make contact at a twentieth connection (78) that is normally open. Again, this action disconnects the power source, antenna or other equipment from the LB and the equipment to be protected, and the battery (16) then provides power to the LB and the equipment. A fourth spark gap (70), a fifth spark gap (71), and a sixth spark gap (72) are connected at the normally open twentieth connection

(78) and will used to divert excessive energy to ground through a twenty-first connection (74) and a twenty-second connection (79).

I claim:

1. A lightning protection apparatus for protecting electrical or electronic equipment operated by a power source, an antenna, or other equipment, comprising:
   a. means for establishing an electrical connection between the apparatus and the power source, antenna, or other equipment, and means for establishing an electrical connection between the apparatus and the electrical or electronic equipment sought to be protected;
   b. a detector (2) for detecting amplitude modulation radio frequency signals emitted from a field of electrostatic energy during an electrical storm and which amplifies the signal and sends the signal to
   c. a trigger relay (4) which, when the signal is adequate, acts as a trigger and sends the signal to activate
   d. an interval timer (6), which instantaneously sends the signal to
   e. a second relay (18), and
   f. a third relay (20), which operate together to simultaneously disconnect the apparatus from the power source, antenna or other equipment and connect the apparatus to
   g. a battery (16), which supplies power to the apparatus through the second relay (18) and the third relay (20) for a duration of time measured by the interval timer (6), whereby the electrical or electronic equipment is isolated and protected from lightning and continues to operate through power supplied by the battery (16).

2. The apparatus of claim 1 comprising in the alternative
   a. a fourth relay (26), or a multiplicity of the fourth relays (26), connected to each other in parallel, and connected to
   b. the interval timer (6) at a first connection (8) and a second connection (10) such that when the detector (2) emits a signal to the trigger relay (4) to activate, the interval timer (6),
   c. a fourth coil (27) of the fourth relay (26) becomes energized and a second sweeper arm (28) breaks contact with the power source, the antenna or the other equipment at a seventh connection (32) thereby isolating and protecting the equipment from lightning, and power is supplied by the battery (16) for continued operation.

3. The apparatus of claim 1 further comprising in the alternative
   a. a second optional relay system (41), or a multiplicity of the second optional relax systems (41) connected in parallel with each other, having
   b. a fifth relay (40) and a sixth relay (48) connected in parallel to each other and connected to the interval timer (6) at the first connection (8) and the second connection (10), such that when the detector (2) emits a signal to the trigger relay (4) to activate the interval timer (6).
   c. a fifth coil (39) of the fifth relay (40) and a sixth coil (47) of the sixth relay (48) become energized causing a third sweeper arm (31) to break contact at an eleventh connection (37) and a fourth sweeper arm (42) to break contact at a fourteenth connection (46) and make contact at a twelfth connection (34) and a fifteenth connection (44), thereby disconnecting the power source, the antenna, or the other equipment and isolating the apparatus and the electrical or electronic equipment, and having
   d. a first fuse (51), a first spark gap (50), a second spark gap (56), and a third spark gap (58) connected at the twelfth connection (34), a second fuse (52) at an eleventh connection (37), and a third fuse (53) at a thirteenth connection (35) for diverting excessive energy levels to ground through a sixteenth connection (54) and a twenty-third connection (33).

4. The apparatus of claim 1 further comprising in the alternative
   a. a seventh relay (68), or a multiplicity of the seventh relays (68) connected to each other in parallel, and connected to the interval timer (6) at the first connection (8) and the second connection (10) at a seventeenth connection (62) and an eighteenth connection (64) of the seventh relay (68), such that when the detector (2) emits a signal to activate the interval timer (6),
   b. a seventh coil (69) of the seventh relay (68) becomes energized and a fifth sweeper arm (66) breaks contact at a nineteenth connection (76) and makes contact at a twentieth connection (78) disconnecting the power source, the antenna, or the other equipment and thereby isolating and protecting the equipment from lightning and supplying power to the apparatus and the electrical or electronic equipment by the battery, (16), and having
   c. a fourth spark gap (70), a fifth spark gap (71) and a sixth spark gap (72) connected at the twentieth connection (78) to divert excessive energy to ground through a twenty-first connection (74) and a twenty-second connection (79).

* * * * *